United States Patent
McLaren et al.

(10) Patent No.: US 11,823,658 B2
(45) Date of Patent: Nov. 21, 2023

(54) TRIAL-BASED CALIBRATION FOR AUDIO-BASED IDENTIFICATION, RECOGNITION, AND DETECTION SYSTEM

(71) Applicant: SRI International, Menlo Park, CA (US)

(72) Inventors: Mitchell Leigh McLaren, Alderley (AU); Aaron Lawson, Mountain View, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 376 days.

(21) Appl. No.: 16/122,531

(22) Filed: Sep. 5, 2018

(65) Prior Publication Data

US 2019/0013013 A1    Jan. 10, 2019

Related U.S. Application Data

(63) Continuation-in-part of application No. 15/013,580, filed on Feb. 2, 2016, now Pat. No. 10,476,872.
(Continued)

(51) Int. Cl.
*G10L 15/00* (2013.01)
*G10L 15/06* (2013.01)
(Continued)

(52) U.S. Cl.
CPC ............ *G10L 15/063* (2013.01); *G10L 15/01* (2013.01); *G10L 15/10* (2013.01); *G10L 17/04* (2013.01);
(Continued)

(58) Field of Classification Search
CPC ....... G10L 15/063; G10L 15/01; G10L 25/51; G10L 17/04; G10L 15/10; G10L 2015/0636; H04L 63/102
See application file for complete search history.

(56) References Cited

U.S. PATENT DOCUMENTS 7,013,283 B1    3/2006  Murdock et al.
9,489,965 B2    11/2016  Scheffer et al.
(Continued)

OTHER PUBLICATIONS

McLaren, M., Lawson, A., Ferrer, L., Scheffer, N., & Lei, Y. (Jun. 2014). Trial-based calibration for speaker recognition in unseen conditions. In Proc. Odyssey. (Year: 2014).*
(Continued)

*Primary Examiner* — Daniel B Potratz
*Assistant Examiner* — Syed M Ahsan
(74) *Attorney, Agent, or Firm* — Shumaker & Sieffert, P.A.

(57) ABSTRACT

The disclosed technologies include methods for generating a calibration model using data that is selected to match the conditions of a particular trial that involves an automated comparison of data samples, such as a comparison-based trial performed by an audio-based recognition, identification, or detection system. The disclosed technologies also include improved methods for selecting candidate data used to build the calibration model. The disclosed technologies further include methods for evaluating the performance of the calibration model and for rejecting a trial when not enough matched candidate data is available to build the calibration model. The disclosed technologies additionally include the use of regularization and automated data generation techniques to further improve the robustness of the calibration model.

20 Claims, 7 Drawing Sheets

Related U.S. Application Data

(60) Provisional application No. 62/181,333, filed on Jun. 18, 2015, provisional application No. 62/118,930, filed on Feb. 20, 2015.

(51) Int. Cl.
  G10L 15/01 (2013.01)
  G10L 15/10 (2006.01)
  G10L 25/51 (2013.01)
  G10L 17/04 (2013.01)

(52) U.S. Cl.
  CPC ...... *G10L 25/51* (2013.01); *G10L 2015/0636* (2013.01)

(56) References Cited

U.S. PATENT DOCUMENTS

| | | |
|---|---|---|
| 10,476,872 B2 | 11/2019 | McLaren et al. |
| 2004/0249650 A1 | 12/2004 | Freedman |
| 2010/0131273 A1 | 5/2010 | Aley-Raz |
| 2011/0144986 A1* | 6/2011 | Yu .................... G10L 15/01 704/255 |
| 2012/0245941 A1 | 9/2012 | Cheyer |
| 2013/0339018 A1 | 12/2013 | Scheffer et al. |
| 2014/0185815 A1* | 7/2014 | Roblek ............... G06F 16/683 381/56 |
| 2015/0081302 A1 | 3/2015 | Syrdal |
| 2015/0112684 A1 | 4/2015 | Scheffer et al. |
| 2015/0112694 A1 | 4/2015 | Scheffer et al. |
| 2015/0199960 A1* | 7/2015 | Huo .................... G10L 15/063 704/245 |
| 2016/0042739 A1 | 2/2016 | Cumani |
| 2016/0098987 A1 | 4/2016 | Stolcke |
| 2016/0119338 A1 | 4/2016 | Cheyer |
| 2016/0248768 A1 | 8/2016 | McLaren et al. |

OTHER PUBLICATIONS

McLaren, M., Lawson, A., Ferrer, L., Scheffer, N., & Lei, Y. (Jun. 2014). Trial-based calibration for speaker recognition in unseen conditions. In Proc. Odyssey (pp. 19-25). (Year: 2014).*

McLaren, Mitchell, et al. "Trial-based calibration for speaker recognition in unseen conditions." Proc. Odyssey. vol. 14. 2014. (Year: 2014).*

McLaren, U.S. Appl. No. 15/013,580, filed Feb. 2, 2016, Office Action, dated Oct. 4, 2018.

McLaren, U.S. Appl. No. 15/013,580, filed Feb. 2, 2016, Office Action, dated Oct. 20, 2017.

McLaren, U.S. Appl. No. 15/013,580, filed Feb. 2, 2016, Interview Summary, dated Jun. 12, 2018.

McLaren, U.S. Appl. No. 15/013,580, filed Feb. 2, 2016, Interview Summary, dated Jan. 17, 2018.

McLaren, U.S. Appl. No. 15/013,580, filed Feb. 2, 2016, Final Office Action, dated Mar. 30, 2018.

Mandasari et al., "Quality measures based calibration with duration and noise dependency for speaker recognition", Science direct, dated 2015, 13 pages.

Mandasari et al., "Quality Measure Functions for Calibration of Speaker Recognition Systems in Various Duration Conditions", dated 2013, 15 pages.

Ferrer et al., "A Unified Approach for Audio Characterization and its Application to Speaker Recognition", dated Jun. 2012, 8 pages.

Song et al., "I-Vector Representation Based on Bottleneck Features for Language Identification", Electronics Letters, vol. 49, Issue 24, dated Nov. 21, 2013, 2 pages.

Mclaren et al., "Advances in Deep Neural Network Approaches to Speaker Recognition", IEEE International Conference on Acoustics, Speech and Signal Processing, dated 2015, 5 pages.

Larcher et al., "I-Vectors in the Context of Phonetically-Constrained Short Utterances for Speaker Verification", IEEE, International Conferene on Acoustics, Speech and Signal Processing, 2012, 4pgs.

Prosecution History from U.S. Appl. No. 15/013,580, dated Feb. 2, 2016 through Jul. 17, 2019, 237 pp.

* cited by examiner

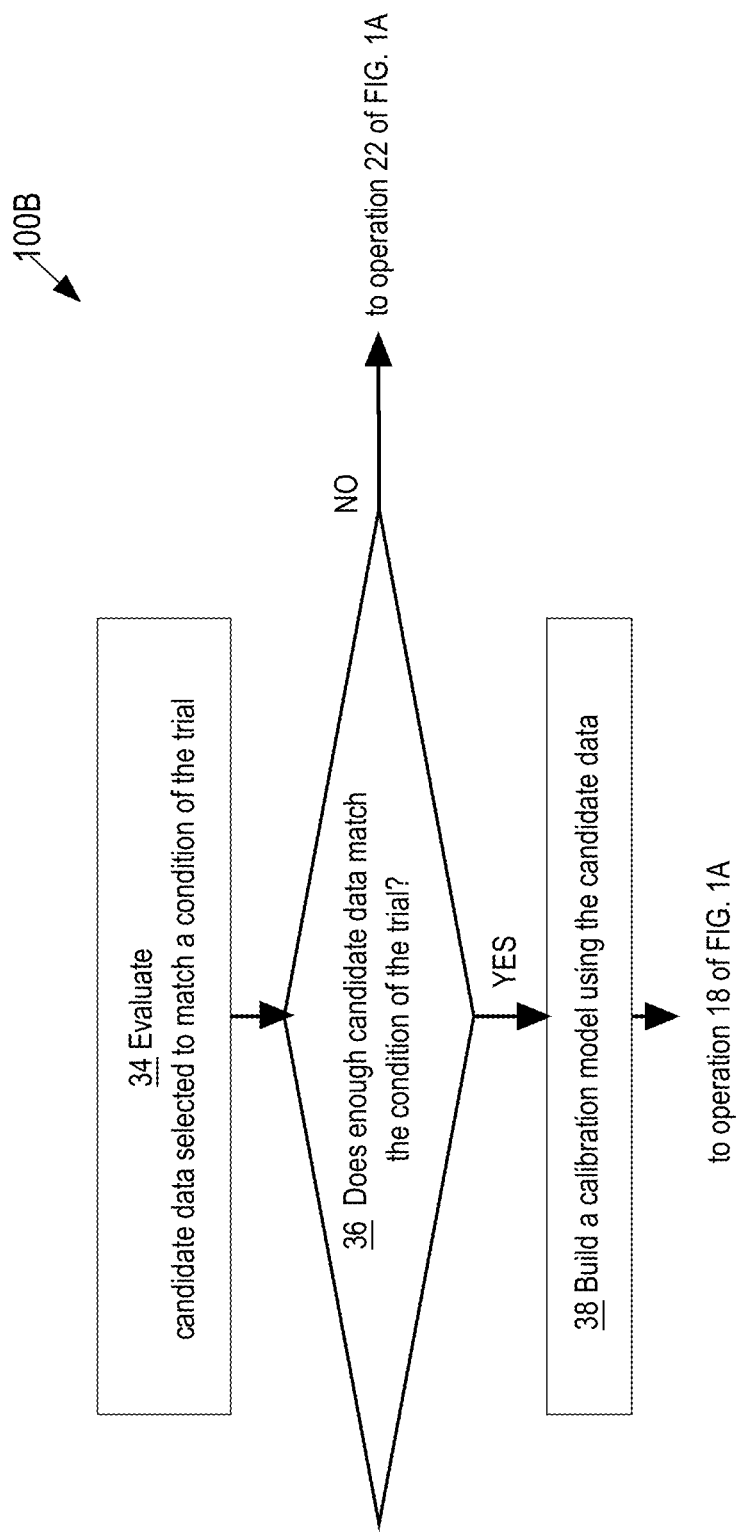

TRIAL-BASED CALIBRATION FOR AUDIO-BASED IDENTIFICATION, RECOGNITION, AND DETECTION SYSTEM

BENEFIT CLAIM

This application claims the benefit as a continuation-in-part of U.S. application Ser. No. 15/013,580, filed Feb. 2, 2016, which claims priority to U.S. Provisional Appln. Ser. No. 62/181,333 filed Jun. 18, 2015 and U.S. Provisional Appln. Ser. No. 62/118,930 filed Feb. 20, 2015.

The entire contents of each of the prior applications referenced in the foregoing paragraph is incorporated by reference as if fully set forth herein.

The applicant rescinds any disclaimer of claim scope in the parent applications or the prosecution history thereof and advises the USPTO that the claims in this application may be broader than any claim in the parent application(s).

GOVERNMENT RIGHTS

This invention was made with Government support under Contract Number DE-AC04-94-AL85000 awarded by Sandia National Laboratories. The United States Government has certain rights in this invention.

TECHNICAL FIELD

This disclosure relates to the technical fields of speech detection, audio event detection, speaker recognition, voice biometrics, trial-based calibration, and data generation for trial-based calibration.

BACKGROUND

Speech-based recognition, identification and verification systems produce a score that reflects the extent to which a speech sample corresponds to a reference sample. In their raw form, these scores are closely tied to the behavioral and environmental conditions from which the speech samples originate and thus contain condition-dependent bias. For example, a speech sample collected while a person is talking on a mobile phone likely has different behavioral and/or environmental characteristics than a sample that is collected from the same speaker riding in a motor vehicle or whose speech is captured by a smart speaker, activity tracker, or smart home appliance.

Calibration can remove condition-dependent bias from the scores. The reliability of a particular calibration method is determined by the calibration parameters. Traditionally, calibration parameters are established before the actual conditions of a speech sample comparison are known. When the conditions of a particular comparison are not reflected in the calibration parameters, the accuracy or reliability of the score is affected adversely.

Scores must be well-calibrated in order to make reliable decisions based on the scores, for example when comparing the scores to a threshold score. The output scores of most speaker recognition systems, for example, are not directly interpretable as stand-alone values. For this reason, a calibration step is usually performed on the scores to convert them into proper likelihood ratios (LR), which have a clear probabilistic interpretation.

Prior approaches use static, pre-trained calibration models that place heavy assumptions on use-case conditions and do not readily adapt to previously unseen conditions, resulting in poor calibration of scores and, correspondingly, incorrect decisions. Additionally, prior approaches are designed to calibrate all possible trials, regardless of whether the trial's conditions are well represented in the development data.

This means that if a trial's conditions are not represented in the development data, the system's output will quite likely be poorly calibrated, and thus the danger exists that the system may not be aware that the scores output in this case are not amenable to interpretation. Because the calibrated scores are used for automated decision making, the system may therefore unwittingly cause erroneous or costly decisions to be made based on poorly calibrated data and thereby propagate the error downstream.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 1A and 1B illustrate example calibration processes, in an embodiment.

Figure 1A:
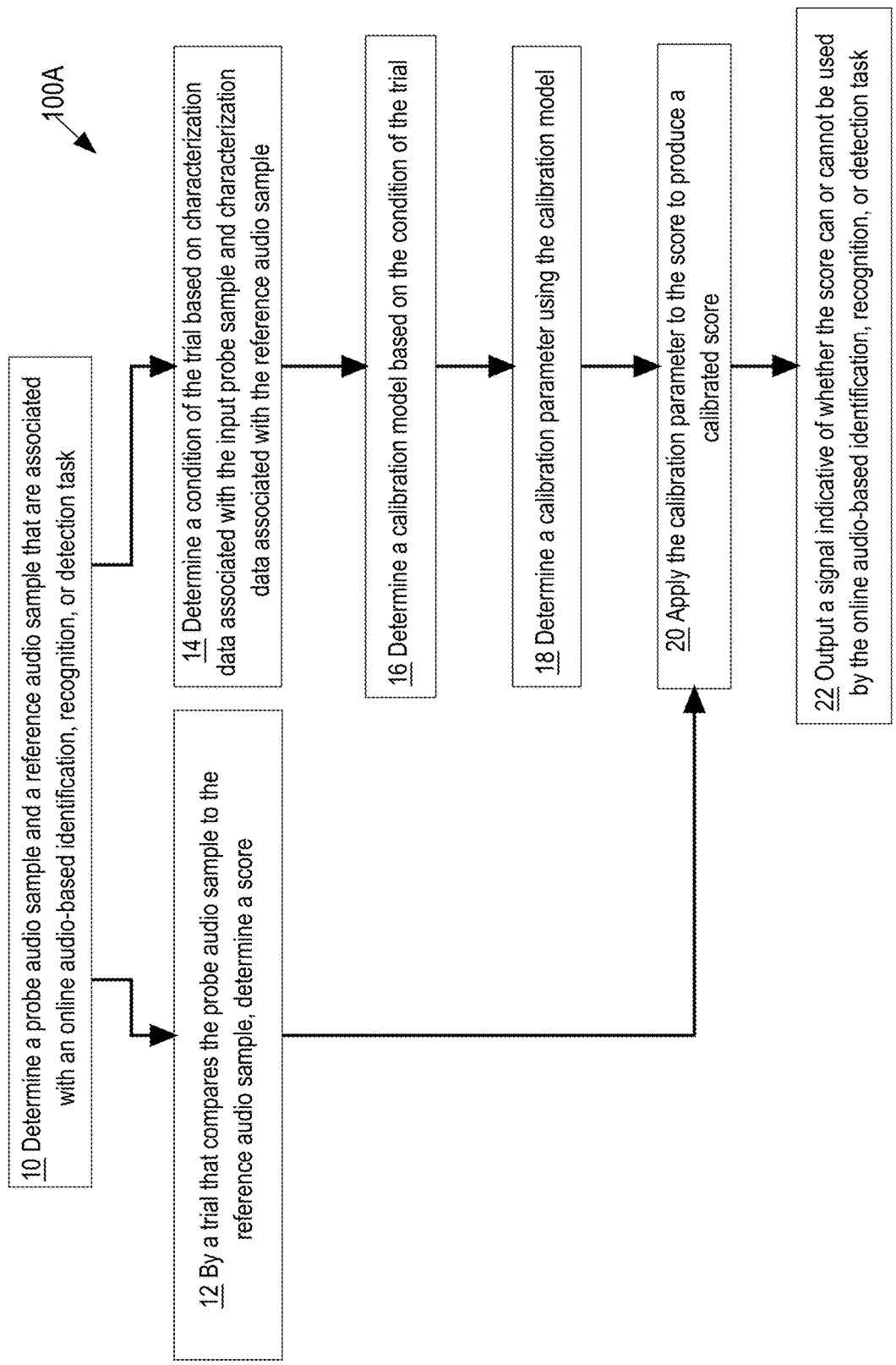

While the present invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

General Overview

This disclosure addresses the need for reliable calibration of scores from audio-based recognition, identification and detection systems both across a wide range of different conditions and in "unseen" conditions, which as used herein may refer to conditions that have not been observed previously or during system development.

A trial as used herein may refer to a particular instance of a computer automated task in which a comparison of audio samples is made. The disclosed technologies provide trial-time production of calibration parameters, which improves the accuracy of calibrated scoring. The improved accuracy of the scores allows the scores to be more reliably compared and understood more consistently across a wide range of trial conditions.

Thus, for example, a particular mobile device equipped with the disclosed technologies can accurately and reliably verify a particular user by his or her voice whether the user is at home, in a noisy crowded arena, or riding in a car. In another example, use of the disclosed technologies can provide consistency of operation across various different types of devices having different hardware configurations for receiving and handling audio samples. As a result, the potential uses of audio-based recognition, identification and detection technologies are greatly expanded to include a wide range of applications.

In an embodiment, audio samples used in a particular trial performed by an audio-based recognition, identification, or detection system are algorithmically compared to available calibration candidate data to determine the most relevant calibration candidate data from which to learn a set of calibration parameters that are specific to the conditions of the comparison.

The relevant calibration candidate data is identified through the comparison of characterization data that is extracted from the samples involved in the trial to characterization data that is extracted from stored data samples that are candidates for inclusion in the candidate data set. Examples of characterization data include meta information extracted from the samples including but not limited to conditional aspects of the samples, such as language, noise and reverberation level, and channel conditions.

The calibration parameters are thus dynamically produced by a mathematically-generated calibration model, where the model has been generated selectively with the trial-relevant candidate data. The calibration parameters are then used to calibrate the score for that same trial. As a result, the calibration process is adaptable to provide more reliable calibrated scores, particularly in the presence of previously unseen conditions.

Benefits

The disclosed technologies greatly expand the utility of audio-based recognition, identification and verification systems by enabling these systems to more readily and robustly adapt to previously unseen sample conditions. Audio-based recognition, identification and detection systems perform automated tasks that include but are not limited to speaker identification, speaker recognition, speaker verification, automatic speech recognition, keyword spotting, language recognition, audio event detection, speech activity detection system, channel recognition, speaking style recognition, active voice-based biometrics, passive voice-based biometrics, speech transcription, speaker segmentation, and/or myriad speech analytics tasks including speech-based detection of gender, emotional state and other non-verbal cues.

These tasks rely on a calibration model that is expected to represent the conditions of end use. Consequently, any mismatch between the data represented by the calibration model and the live use conditions will result in suboptimal operation and performance of the system. The disclosed technologies seek to minimize this mismatch at the time of the live trial by enabling dynamic tailoring of calibration parameters to the particular use conditions of the trial and thereby improve the adaptability of these systems to real use conditions.

Overview of Trial-Based Calibration Process

FIG. 1A illustrates an example process 100A in which aspects of the present disclosure may be implemented. Process 100A is implemented in software, hardware, or a combination of software and hardware. In an embodiment, process 100A is embodied in computer program code schematically depicted in FIG. 2 as a number of software-based components that include audio-based trial software 50, characterization software 52, model building software 62 and calibration software 72, described in more detail below. The software-based component(s) in which process 100A is embodied are executable by processor(s); for example by computing device(s) 110, 140 shown in FIG. 3, described in more detail below.

Process 100A implements trial-based calibration in a manner that is suitable for use in situations in which pre-training a matched, condition-dependent calibration model is not possible, such as cases in which the trial conditions are unknown and/or the conditions actually or potentially differ across trials.

In operation 10, process 100A determines a probe audio sample and a reference audio sample that are associated with an audio-based identification, recognition, or detection system. In an embodiment, the probe audio sample and the reference audio sample are audio recordings stored in digital audio files, respectively. The exact nature and content of the input and reference audio samples is dependent on the particular type of audio-based recognition, identification or detect task being performed.

For example, in a speaker recognition application, the probe audio sample contains speech of a particular user captured by a microphone during a real-time activity, while the reference sample contains speech captured by a microphone during a previously-conducted enrollment process. In other applications, the probe sample and the reference sample are obtained during the same speech session, or both samples are obtained during different sessions of the same type of activity. For example, both samples are obtained during real-time activity(ies) or both samples are obtained during enrollment process(es).

In operation 12, process 100A determines a score that represents a comparison of the probe audio sample to the reference audio sample, where the comparison is made by a trial that is performed by or in connection with the particular type of audio-based identification, recognition, or detection task being conducted. For example, in a speaker recognition system, the score determined in operation 12 is a raw score that is computed for a trial involving a comparison of enrollment and test samples using the speaker recognition system. In an embodiment, operation 12 does not perform the trial but merely obtains or receives the score from the audio-based identification, recognition, or detection system through, for example, an inter-process communication or an application programming interface (API).

In operation 14, process 100A determines a condition of the trial based on both characterization data that is associated with the probe audio sample and characterization data that is associated with the reference audio sample. To do this, process 100A undertakes an information extraction or query process, for example, to determine the characterization data associated with the input and reference audio samples, respectively. Examples of characterization data include numerical values and/or alphanumeric text indicative of behavioral and/or environmental characteristics of the probe audio sample and behavioral and/or environmental characteristics of the reference audio sample, respectively. Such characterization data includes but is not limited to: channel data or noise data or reverberation data or language data or speaker gender data or sample length data or any combination of any of these types of characterization data. In some embodiments, characterization data includes data representative of non-verbal characteristics of a speaker's speech sample, such as prosodic features, which may indicate variations in loudness, tone, or speaking rate, for example.

In an embodiment, a Universal Audio Characterization (UAC)-based technique is used to determine the characterization data for the input and reference audio samples, respectively. The UAC represents the conditions of a speech signal in terms of a small dimension vector of class posteriors. Each condition of interest is modeled using a single Gaussian; that is a Gaussian Backend is used for each condition of interest. An example of an approach for acoustic signal characterization that may be used in connection with the disclosed technologies is described in U.S. Pat. No. 9,489,965, assigned to SRI International.

In another embodiment, the characterization data is extracted from the audio samples using, for example, a classical acoustic feature extraction technique. Examples of acoustic features include mel frequency cepstral coefficients (MFCCs). Alternatively or in addition, the characterization data is contained in meta tags or annotations that are appended to the digital audio files, or, where the characterization data is stored in an external file or database, the characterization data is obtained through a search query or other information retrieval technique. Examples of such meta information include language, gender, and geographic location identifiers, as well as sample duration data (as measured in seconds, for example).

The decision as to which characterization data to use to determine a condition of a trial will depend on the requirements of a particular implementation, particular goals for the audio-based recognition, identification or detection system, or particular characteristics of the audio samples. Analysis of the characterization data of both the probe audio sample and the reference audio sample used in the trial determines the condition, in an embodiment.

For example, the characterization data may indicate high noise and low reverb, or vice versa, for a particular probe sample but high reverb and low noise for the reference sample used in the trial. This mismatch between the characterization data of the input and reference samples indicates a condition of the trial. In other embodiments, the condition is indicated at a higher level of abstraction, for example by a semantic tag associated with one or more of the digital audio files, such as "cellphone conversation" or "microphone data." In an embodiment, each condition is designed to be highly homogenous, so as to allow a highly matched calibration candidate data set to be defined for each condition.

In operation 16, process 100A determines a calibration model based on the condition of the trial that is determined in operation 14. The process for determining the calibration model varies depending upon the type of algorithmic approach that is used to build the model. For example, in a speaker recognition embodiment, the calibration model can be trained using a regularized linear logistic regression algorithm that transforms the raw, signed scores of a set of trials conducted using selected candidate data (where −1 indicates a different-speaker/imposter trial and +1 indicates a same-speaker/target trial) into a proper log-likelihood ratio (LLR).

A different-speaker/imposter trial involves a pairwise comparison of audio samples that are known to belong to different speakers while a same-speaker/target trial involves a pairwise comparison of audio samples that are known to belong to the same speaker. The purpose of the same-speaker trials is to determine features that are condition invariant in that the two samples have those features in common although the samples may have been captured under very different conditions. The purpose of different-speaker trials is to determine features that are clearly distinctive as belonging to the speaker of one sample or the other. Using a combination of same-speaker and different-speaker trials, characterization data can be clearly distinguished from speech data.

In another embodiment, a separate calibration model is trained for every new trial. An example of this approach is shown in FIG. 1B, which is described below.

In another embodiment, a deep neural network (DNN)-based model is trained to reproduce the calibration parameters learned from a set of trial-relevant candidate data that has been processed using the approach of FIG. 1B. Use of the DNN-based model removes the need to perform the steps of selecting trial-relevant calibration data and training a calibration model for each trial.

In operation 18, process 100A determines a trial-specific value of a calibration parameter using the calibration model that has been determined by operation 16. To do this, process 100A passes the input and reference audio samples and the raw score through the calibration model. Examples of calibration parameters are shift, scale, and bias.

In operation 20, process 100A applies the calibration parameter(s) that have been determined in operation 18 to the score that has been obtained in operation 12 to produce a calibrated score. Operation 20 involves, for example, multiplying or dividing the score by the calibration parameter value or adding the parameter value to the score or subtracting the parameter value from the score, or, if multiple calibration parameters are determined, a combination of any of these mathematical operations are performed on the raw score to produce the calibrated score.

In operation 22, process 100A outputs data indicative of whether the calibrated score can or cannot be used by the audio-based identification, recognition, or detection system. In an embodiment, the output indicates that the trial has been rejected or that the trial has been accepted. If the trial is accepted, operation 22 may output the calibrated score. If the trial is rejected, operation 22 may recommend use of a different calibration approach. An example of how a determination to accept or reject a trial is made is described below with reference to FIG. 1B.

Trial-Specific Calibration Model

FIG. 1B illustrates an example process 100B in which aspects of the present disclosure may be implemented. Process 100B is implemented in software, hardware, or a combination of software and hardware. In an embodiment, process 100B is embodied in computer program code schematically depicted in FIG. 2 as a number of software-based components that include audio-based trial software 50, characterization software 52, model building software 62 and calibration software 72, described in more detail below. The software-based component(s) in which process 100B is embodied are executable by processor(s); for example computing device(s) 110, 140 shown in FIG. 3, described in more detail below.

Process 100B implements an embodiment of a trial-based calibration process in which a separate, condition-dependent calibration model is automatically trained for every new trial.

In operation 34, process 100B evaluates candidate data selected to match a condition of the trial to determine the extent to which the candidate data does match the trial condition. In an embodiment, the candidate data is a subset of available development data, where the subset includes input and reference sample pairs that are selected to match as closely as possible the characteristics of the input and reference sample pairs of a particular trial. Operating on the assumption that each trial may be slightly different from all other trials, a different subset of the available development data is selected to build a calibration model to match each trial.

In an embodiment, the process of selecting the candidate data includes a clustering process, which creates clusters of sample pairs according to one or more similarity metrics. Clustering includes use of an unsupervised machine learning-based process, in some embodiments. For example, sample pairs may be clustered using a k means clustering process, in an embodiment.

Development data as used herein may refer to data collected from previously conducted trials, and may include input and reference audio samples, their respective characterization data, raw and calibrated scores resulting from pairwise comparisons of the input and reference samples performed during previous trials, calibration parameters, and performance data related to the calibration parameters.

For clarity in the discussion that follows, a particular real-life live trial may be referred to as a live trial and a probe audio sample and reference audio sample pair involved in a live trial may be referred to as a trial pair. Similarly, a trial conducted for the purpose of building a calibration model may be referred to as a calibration trial and a probe audio sample and reference audio sample pair evaluated by the candidate data selection process of operation 34 may be referred to as a calibration pair.

The trial-relevant candidate data subset selected from the available development data includes a number of calibration pairs. The calibration pairs are selected based on their similarity to the trial pair. In most cases calibration pairs are selected that are similar to the trial pair in terms of condition, so that any effect of the condition on the score can be neutralized by the calibration procedure.

However, if the similarity metric used to compare the calibration pairs to the trial pair is affected by the characteristics of the voices in the samples, then calibration data that is similar to the test samples in terms of voice can be selected. Thus, in some embodiments, voice data extracted from the input and reference audio samples is used alternatively or in addition to the characterization data, for purposes of evaluating the degree to which a particular calibration pair matches the trial pair.

In a speaker recognition embodiment, the candidate data subset includes calibration pairs that are selected for both different-speaker/imposter trials and same-speaker/target trials. Methods for selecting the trial-relevant candidate data set based on similarity metrics and/or other criteria are discussed in more detail below with reference to FIG. 3.

If the candidate data subset contains enough calibration pairs having characterization data that matches the characterization data of the trial pair, a calibration trial is conducted for each of the calibration pairs in the candidate data subset. In operation 36, process 100B determines whether enough of the candidate data evaluated in operation 34 matches the condition of the live trial. What constitutes "enough" candidate data for purposes of operation 36 will depend on the requirements of a particular application, and may be measured in terms of the quantity and/or quality of the match between the characterization data and/or voice data of the calibration pairs and the characterization data and/or voice data of the trial pair. In an embodiment, the determination made in operation 36 is determined by 1) counting the number of calibration pairs whose similarity to the trial pair exceeds a similarity threshold (SimThr) 2) determining whether the number counted in 1) is less than a defined maximum number of calibration trials (MaxTgt) and 3) determining whether the number counted in 1) is greater than a defined minimum number of calibration trials (MinTgt).

When operation 36 concludes that there is enough candidate data that matches the condition of the trial, then in operation 38, process 100B builds a calibration model using the selected candidate data evaluated in operation 34. Following operation 38, process 100B proceeds to operation 18 of FIG. 1A and continues on with calibration of the live trial.

When operation 36 concludes that there is not enough candidate data that matches the condition of the trial, then process 100B proceeds to operation 22 of FIG. 1A, described above. In an embodiment, operation 38 trains the calibration model using a linear logistic regression approach such as the approach described above with reference to operation 16 of FIG. 1A.

In an embodiment, when operation 36 has determined that there is an insufficient amount of candidate data that matches the condition of the trial, operation 22 of FIG. 1A outputs a signal indicating that the score cannot be reliably used by the audio-based recognition, identification or detection system. For example, if the number of calibration pairs satisfying SimThr is less than MinTgt, then in some embodiments calibration of the trial is not attempted at all and the signal output by operation 22 causes the system to skip the calibration of the trial. This approach reduces the risk of incorrect decisions being made downstream as a result of wrongly calibrated trials.

Alternatively, in some embodiments, rather than skipping calibration altogether, the signal output by operation 22 indicating insufficient candidate data causes the system to attempt the trial calibration using a different type of calibration model, or simply causes the calibrated score (e.g., LLR) to be set to zero (0.0), thereby minimizing the downstream impact of a potentially suboptimal calibration. For example, the system may default to a global calibration model, which is trained to more generically recognize a large range of conditions, if operation 36 concludes that a trial-relevant calibration model cannot be reliably trained on the basis of the available candidate data.

Example Arrangement of Software-Based Components

Figure 2:
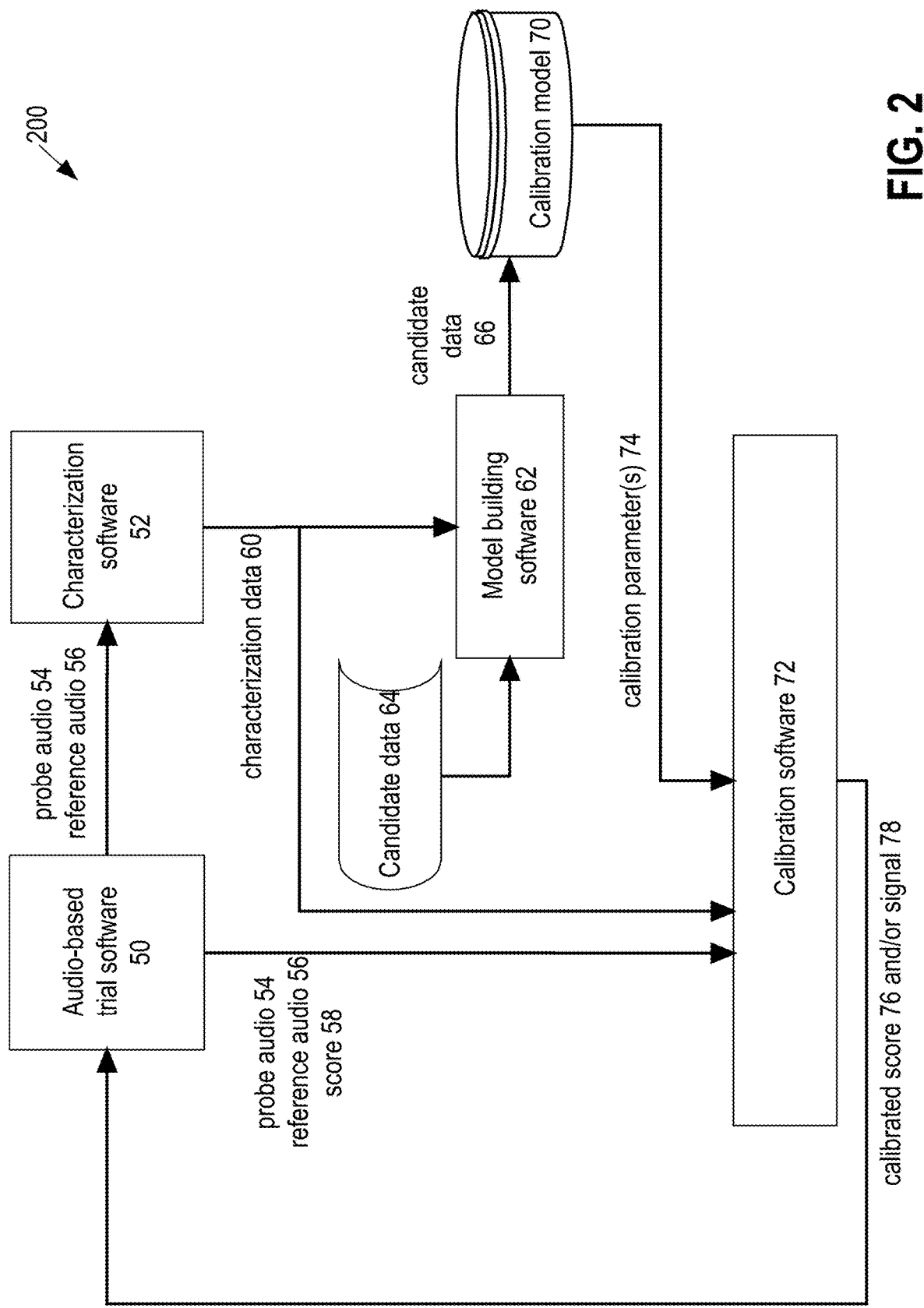
FIG. 2 illustrates an example block diagram of software-based components, in an embodiment.

FIG. 2 illustrates an example arrangement of software-based components in which aspects of the present disclosure may be implemented. In an embodiment, the software-based components include audio-based trial software 50, characterization software 52, model building software 62 and calibration software 72, as well as candidate data 64 and calibration model 70. The software-based component(s) in which process 100B is embodied are executable by processor(s); for example computing device(s) 110, 140 shown in FIG. 3, described in more detail below.

Audio-based trial software 50 performs the audio-based recognition, identification, or detection task. In an embodiment, audio-based trial software is commercially-available or open-source speaker recognition software, or a portion of such software (for example, a particular sub-module that performs the comparison-based trials). Audio-based trial software 50 performs the comparison-based trial to generate a score 58 for a sample pair, where the sample pair includes a probe audio sample 54 and a reference audio sample 56. The probe audio sample 54 and reference audio sample 56 are output or otherwise made available to both characterization software 52 and calibration software 72. Score 58 is a raw score that is output or otherwise made available to calibration software 72.

Characterization software 52 extracts characterization data from probe audio sample 54 and reference audio sample 56, respectively. In an embodiment, characterization software 52 includes a commercially-available or open-source UAC tool. Characterization software 52 outputs characterization data 60, which includes characterization data for probe audio sample 54 and reference audio sample 56, respectively.

Model building software 62 trains a calibration model 70 by applying a linear regression-based algorithm to candidate data 66. Candidate data 66 is a subset of stored candidate data 64, also referred to as available development data. An example of candidate data 64 is a large and varied set of development data in which calibration parameters are tuned. Another example of candidate data 64 includes audio recordings that include speech in several different languages and microphone conditions. Other examples of candidate data 64 include recordings of cellphone conversations and telephone conversations and recorded interviews from speakers having a particular accent (such as Australian English).

In some embodiments, candidate data 64 is augmented by creating new samples by copying and adding noise or reverberation to the existing samples (where the existing samples remain in the data set as well, undegraded). In some embodiments, candidate data 64 is restricted to speech samples of only a specific language or channel. The candidate data 64 is divided into pairs of input and reference samples and these pairs are assigned to same-speaker and different-speaker trials.

Model building software 62 selects candidate data 66 based on characterization data 60 of the sample pairs, or a combination of characterization data and voice data of the sample pairs, as mentioned above. In various embodiments, model building software 62 is embodied as proprietary computer code, open-source software, commercially available software, or a specially configured combination of any of the foregoing.

Calibration software 72 receives as inputs probe audio sample 54, reference audio sample 56 and score 58. Calibration software 72 uses calibration model 70 to determine calibration parameters 74 based on characterization data 60. Calibration software 72 applies calibration parameters 74 to score 58 and outputs calibrated score 76 for use by audio-based trial software 50. Alternatively or in addition, calibration software outputs a signal 78 indicating that the candidate data 66 or calibration model 70 or calibrated score 76 can or cannot be reliably used for decision making in relation to the trial involving the probe audio samples 54 and reference audio samples 56. In various embodiments, calibration software 72 is embodied as proprietary computer code, open-source software, commercially available software, or a specially configured combination of any of the foregoing.

Example Networked Computing Environment

Figure 3:
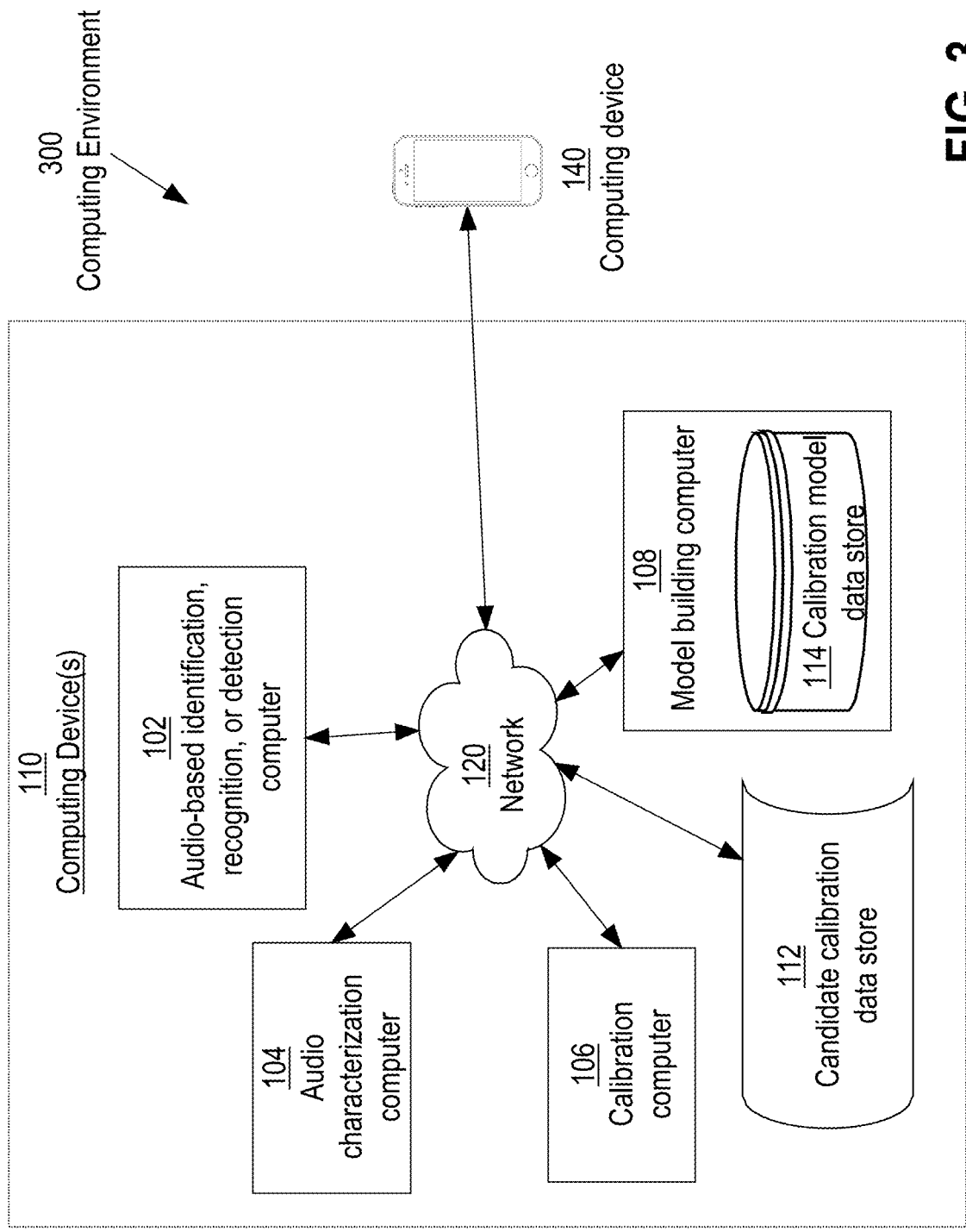
FIG. 3 illustrates an example networked computing environment, in an embodiment.

FIG. 3 illustrates an example computing environment in which aspects of the present disclosure may be implemented. In the example of FIG. 3, computing environment 300 includes at least computing device(s) 110 and a computing device 140, which are communicatively coupled to an electronic communications network 120. In an embodiment, computing device 140 is a client computing device, such as a mobile computing device, smart phone, wearable computing device, smart appliance, laptop machine, or other consumer-oriented computing device, while a computing device 110 is a server computer or network of server computers connected to the Internet, in the cloud, for example. In an embodiment, computing device 140 includes an embedded microphone and speaker, as well as a wireless or optical network interface for communicating with network 120.

Implemented in computing devices 110, 140 using computer software, hardware, or software and hardware, are combinations of automated functionality, data structures, and digital data, which are represented schematically in FIG. 3 as audio-based identification, recognition, or detection computer 102, audio characterization computer 104, calibration computer 106, model building computer 108, candidate calibration data store 112, calibration model data store 114.

Although computing environment 300 may be implemented with any number N, where N is a positive integer, of audio-based identification, recognition, or detection computer 102, audio characterization computer 104, calibration computer 106, model building computer 108, candidate calibration data store 112, calibration model data store 114, computing devices 110, and computing devices 140, respectively, in this disclosure, these elements may be referred to in the singular form for ease of discussion. Also, audio-based identification, recognition, or detection computer 102, audio characterization computer 104, calibration computer 106, model building computer 108, candidate calibration data store 112, calibration model data store 114, and computing device 140, are shown as separate elements in FIG. 3 for ease of discussion but the illustration is not meant to imply that separation of these elements is required.

The illustrated systems and their functionality may be divided over any number of physical systems, including a single physical computer system, and can communicate with each other in any appropriate manner. For example, in some implementations, audio-based identification, recognition, or detection computer 102, audio characterization computer 104, calibration computer 106, model building computer 108, are all embodied in computing device 140.

Any of the components of computing environment 300 may be equipped with input devices for purposes of obtaining input data. For example, computing device 140 may be equipped with or coupled to a keyboard, keypad, touchscreen, touchpad, microphone, digital camera (still or video) or other sensing device(s) configured to obtain input data. Such input data is received by computing device 140 and routed to other components of the computing environment 300 as described in this document or otherwise as needed.

Likewise, any of the components of computing environment 300 may be equipped with output devices for purposes of presenting output. For example, computing device 140 may be equipped with or coupled to a display screen, touch screen, speaker, digital camera (still or video) or other output device(s) configured to output information. Such output data may be received from other components of the computing environment 300 as described in this document or otherwise as needed. For example, a graphical user interface operated by computing device 140 may display graphics including dialog boxes and graphical notifications in order to facilitate the operations of any of the software components shown in FIG. 2.

In general, each of computing device(s) 110, 140 and network 120 contains hardware components similar or analogous to corresponding components shown in FIG. 5, described below.

Overview of Model Building Processes

Figure 4:
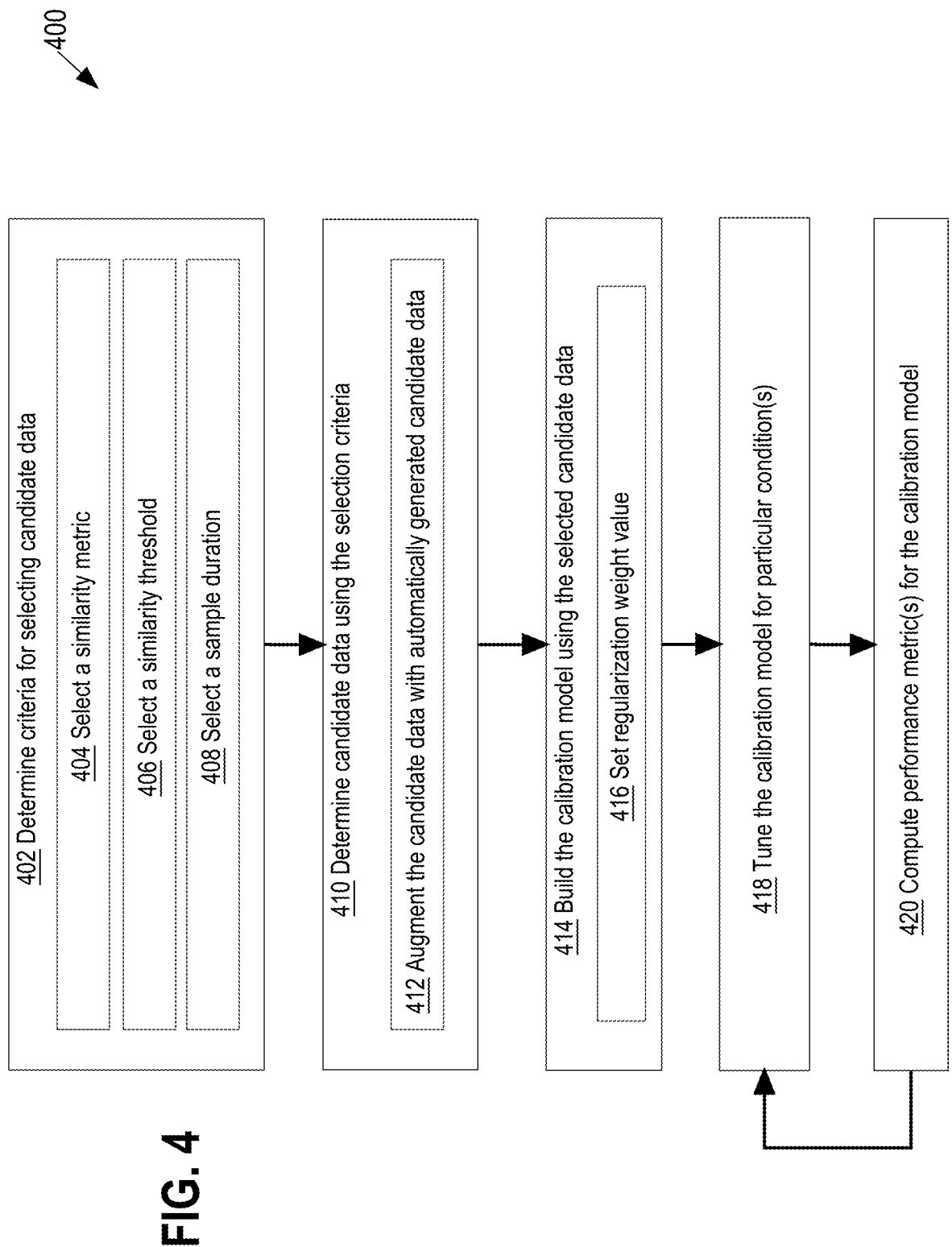
FIG. 4 illustrates an example model building process, in an embodiment.

FIG. 4 illustrates an example process 400 in which aspects of the present disclosure may be implemented. Process 400 is implemented in software, hardware, or a combination of software and hardware. In an embodiment, process 400 is embodied in computer program code schematically depicted in FIG. 2 as a number of software-based components that include audio-based trial software 50, characterization software 52, model building software 62 and calibration software 72, described in more detail below. The software-based component(s) in which process 400 is embodied are executable by processor(s); for example computing device(s) 110, 140 shown in FIG. 3, described in more detail below.

Process 400 builds a calibration model in a manner that results in the calibration model being matched to a condition of a trial. In operation 402, process 400 determines one or more criteria for selecting candidate data. Examples of criteria used to select training samples from a set of available samples are similarity of characterization data, similarity of voice data, similarity threshold, and sample duration. Any combination of these criteria or single criterion may be used in any particular embodiment.

In an embodiment, the selection of candidate data by process 400 is governed by three parameters: (1) a similarity threshold (SimThr), (2) a maximum number of target trials (MaxTgt), and (3) a minimum number of target trials (MinTgt). Given these values, and a given trial pair, the selection algorithm proceeds as follows: the similarity values from the trial's reference sample to all reference samples in the candidate data and from the trial's probe sample to all probe samples in the candidate data are computed.

In operation 404, process 400 select a similarity metric to be used to evaluate the similarity of candidate samples to the trial samples. Similarity metric as used herein is a measurement of similarity between the trial's samples and the candidate calibration samples. Examples of suitable metrics include, but are not limited to: i-vector, UAC-based, and condition PLDA (probabilistic linear discriminant analysis).

I-vector (IV) similarity: The i-vector similarity between two samples is given by the dot product between the i-vectors from the two samples divided by the product of the norms of the two i-vectors.

UAC-based (UAC) similarity: A set of universal audio characterization (UAC) models are trained to predict different aspects of an audio signal, which could include gender, language, channel, noise type and level, and so on. Each UAC model consists of a Gaussian model for each class to be predicted (for example, female and male for the gender UAC model) with shared covariance matrix. The features modeled by the UAC are the same i-vectors extracted by the speaker recognition system. The output of each UAC model is the posterior probabilities for each of the corresponding classes. The posteriors from all UAC models are concatenated and each component is normalized by replacing it with the rank of the value with respect to all the values for that component in the calibration data. Finally, the similarity between two samples is given by the dot product between the rank-normalized vectors of UAC posteriors for the samples.

Condition PLDA (CPLDA) similarity: The condition probabilistic linear discriminant analysis (PLDA) similarity is given by the score produced by a PLDA model trained to estimate the log-likelihood ratio of the samples' i-vectors given the hypothesis that the two samples come from the same condition versus the hypothesis that they come from different conditions. The model is trained with data from many different speakers under many different conditions. Conditions are given by the cross-product of the samples' gender, language, channel, noise type, noise dB level, etc.

The UAC and the CPLDA metrics are conceptually similar in that they are trained to be independent of the similarity between the speakers in the two samples, focusing on the similarity between their conditions. The IV metric, on the other hand will be sensitive to both the speakers and the conditions in the two samples. In principle, this may not be a desirable characteristic of a metric for all applications. In many applications, it is desirable to select calibration data that is similar to the trial pair in terms of condition so that any effect of the condition on the score can be neutralized by the calibration procedure.

If the similarity metric is affected by the characteristics of the voices in the test samples, then calibration data that is similar to the test samples in terms of voice can be selected. If the voices in the reference and input sides of the trial are very different, selecting calibration data that is similar to the trial pair both in terms of conditions and voices would be appropriate.

In operation 406, process 400 selects a similarity threshold that is used to determine whether to include a particular sample of candidate calibration data in the candidate data subset. In an embodiment, all calibration (reference and input) samples with a similarity to the corresponding trial's side larger than a certain threshold t are selected and the trials obtained by pairing all selected reference samples against all selected probe samples are used to train a calibration model for the live trial.

The threshold t is searched among all similarity values larger than the input parameter SimThr using a binary search that stops when the number of target trials resulting from the selection is approximately MaxTgt (allowing for an error of plus or minus 5% of MaxTgt to speed the search) or when t is equal to SimThr.

The threshold t used for sample selection is unlikely to be smaller than SimThr and it might be bigger if more than MaxTgt target samples would be selected when t=SimT hr. The number of target samples selected may be smaller than MaxTgt. If the number is smaller than MinTgt then calibration of the trial is deemed risky.

In operation 408, process 400 selects a sample duration. The duration of the audio samples can have a significant effect in calibration performance. In some cases, samples that are relatively clean and short can improve calibration performance. Speech sample duration information can be directly obtained from, for example speech activity detection (SAD) output.

By chopping each audio sample in the candidate data to a predefined set of durations, a multi-duration candidate data set can be created (with the limit given by the longest-duration samples that are available). In an embodiment, when the candidate data contains samples with variable speech durations, a two-stage calibration approach is used. First, for each side (input and reference samples) of a comparison in a trial, the calibration data that best matches the duration of the sample is selected. Second, trial-based calibration is performed only on this matched-duration subset of the data.

In operation 410, process 400 determines the candidate samples to be included in the candidate data, using the selection criteria. As mentioned above, the candidate data set is determined using any combination of the available selection criteria.

In operation 412, process 400 augments the candidate data with automatically generated candidate data. In an embodiment, operation 412 automatically generates additional relevant candidate data (either by locating original data or augmenting data) to match the trial conditions (such as conditions observed during a speech detection request) in order to dynamically improve the calibration and the resulting reliability of the audio-based recognition, identification, or detection system. To do this, process 400 selects data from an available source of candidate data that is most representative of the conditions in the trial sample (input and reference audio samples in the case of speaker recognition).

Based on the conditions detected in the trial sample, the candidate data is augmented to be closer to the true conditions of the trial sample using the convolution of a transfer function and samples of the noise extracted from the test audio. In various embodiments, the transfer function is a compression algorithm, bandwidth filter, or similar algorithm, and is determined using automated analysis of the audio samples. Using the automatically generated samples, the calibration model for the trial is dynamically trained to more closely match the conditions of the trial and produce a well-calibrated score.

In one embodiment, output of a speech activity detection system segments the audio into speech/non-speech with high accuracy, such that the non-speech data of the trial samples, along with the signal-noise-ratio, can be used to intentionally corrupt the clean portions of the data (e.g., voice portions) with additive noise sampled from the trial audio samples involved in the comparison. Alternatively or in addition, the compression, reverberation and channel conditions of the trial can be detected and used to convolute the candidate data subset with an estimation of the transfer function.

In this way, automatic augmentation of the candidate data set with additional characterization data can increase the representation of realistic and matched conditions in the candidate data set that will improve the estimation of the parameters for the calibration model and, therefore, improve the final accuracy and reliability of the audio-based recognition, identification, or detection system across a wide variety of conditions.

In operation 414, process 400 builds the calibration model using the selected candidate data. In an embodiment, the candidate data is input to a linear regression-based process to train the calibration model.

In operation 416, process 400 incorporates regularization into the training of the calibration model. Regularization is used to train individual trial-specific calibration models. Regularization reduces the number of samples needed for model training, which, in turn, allows for a better match between the selected candidate data and the trial data, which is particularly useful when limited matched data is available for each trial condition.

In one embodiment, a regularized version of linear logistic regression is used, where a term (the regularization weight value) is added to the objective function to penalize the distance from the estimated parameters to a default set of parameters. In one embodiment, a regularized linear logistic regression is used for calibration of speaker recognition systems, where the system uses the regularization weight value to regularize toward default parameter values. That is, the objective function is maximized in an effort to make calibration parameter(s) easier to tune.

The default parameters for regularization are given by the parameters that are trained using all of available calibration data. The use of regularization allows the MinTgt parameter to be reduced, which in turns allows proper calibration of a larger percentage of samples even when the amount of candidate data matched to a certain trial is limited.

Use of a regularization weight value can improve calibration performance, particularly when MaxTgt is relatively small. Regularization weight values between 0.02 and 0.05 can lead to improved performance for smaller values of MaxTgt. In embodiments that are designed to work well for smaller calibration databases for which MaxTgt might have to be set to a relatively small value, the regularization weight for the rest of the experiments can be set to 0.05, which may be optimal for MaxTgt in the range of 30 to 100.

In operation 418, process 400 tunes the calibration model for particular condition(s).

In an embodiment, calibration parameters are tuned using a collection of conditions where each condition is designed to be highly homogeneous. This homogeneity allows a highly matched calibration set to be defined for each condition. This, in turn, enables computation of matched calibration performance for each condition, which can be used as a baseline to compare the performance of the proposed algorithms.

In one embodiment, the calibration system parameters are tuned using the weighted average Closs as well as the worst Closs over all development sets (where Closs is the Cllr loss, which is the cost of likelihood ratio loss, a performance metric). If a system setup is similar or even slightly better to another setup in terms of average Closs but significantly worse in terms of the worst Closs, then the setup having the lower worst Closs is used in implementations in which robustness to a wide variety of conditions is a priority. Evaluation of Closs and/or other performance metrics can also be used to adjust the regularization weight value, described above.

In operation 420, process 400 computes performance metric(s) for the calibration model. These performance metrics can be used to evaluate the performance of the trial-based calibration versus other calibration methods.

Example performance metrics include but are not limited to: the cost of likelihood ratio (Cllr), the Cllr loss (Closs), and the percent of rejected trials (% Rej). The Cllr measures the quality of the calibrated scores as LLRs using a logarithmic cost function. This metric is affected both by the discrimination and calibration performance of the system.

Toward the goal of improving calibration of the scores, to ensure that the system's scores are interpretable as proper LLRs, regardless of the system's discrimination performance, Closs is a useful performance metric.

In an embodiment, Closs is defined as the relative difference between the Cllr of a certain calibration procedure (e.g., TBC, or global calibration), CllrT, and the Cllr obtained when training the calibration model with calibration data that is perfectly matched to the test set, CllrM: Closs=(CllrT−CllrM)/CllrM.

In embodiments where the system is designed to refuse to calibrate a trial if insufficient matched data can be selected for calibration, a performance metric of interest is the percent of trials that were calibrated by the system.

In some embodiments, where it is useful to summarize metrics over all trials within a certain group, a weighted average Closs is used, where the weight is given by the fraction of trials that are calibrated by the system for each set of trials.

Based on one or more of the performance metrics computed in operation 420, process 400 returns to operation 418 and perform further tuning of the calibration model, or simply reports out the performance metrics.

Use Case: Speaker Recognition—Exemplary Implementations

The following example describes an application of one embodiment of the disclosed technologies to automated speaker recognition. Characterization data, which may include meta-data, is extracted from audio samples that are used in both sides of the comparison (i.e., audio to model a known speaker and test audio containing an unknown speaker). The characterization data attains to but is not limited to conditional aspects, including environmental or behavioral characteristics of the sample such as language, noise and reverb level, and channel conditions.

Subsets of audio (or a representation thereof) similar to both sides of the comparison are then selected from a set of candidate calibration data based on the extracted characterization data. A set of same-speaker and different-speaker comparison scores is then generated from this selected data, using ground truth labels for the calibration data, and a set of calibration parameters (for example, shift and bias) is learned from these comparison scores. In an embodiment, standard logistic regression is used to learn the calibration parameters. In other embodiments, other mathematical techniques are used to learn and/or predict the calibration parameters; for example, a neural network-based technique, a Gaussian mixture model, support vector machines and/or other machine learning-based techniques. The resulting calibration parameters are used to transform the speaker comparison scores into a log-likelihood ratio suitable for decision-making through the application of a threshold.

MFCC i-Vector/PLDA Speaker Recognition System

In a specific embodiment, a standard mel-frequency cepstral coefficient (MFCC)-based i-vector/PLDA speaker recognition system is used as the audio-based trial software 50. The MFCC acoustic features are based on 20-dimensional MFCCs including CO, spanning the frequency range of 200-3300 Hz using 24 filter banks, a window of 25 ms, and a step size of 10 ms. These features are used as input for speech activity detection (SAD) and for the speaker recognition system.

For SAD, in an embodiment, a deep neural network (DNN)-based model is trained on telephone and microphone data from a subset of the Mixer data used in SRE 2008, consisting of more than 19,000 samples. The MFCC features are mean and variance normalized using a sliding window of two seconds, and are concatenated over a window of 31 frames. The resulting 620-dimensional feature vector forms the input to a DNN that consists of two hidden layers of sizes 500 and 100. The output layer of the DNN consists of two nodes trained to predict the posteriors for the speech and non-speech classes. These posteriors are converted into likelihood ratios using Bayes rule (assuming a prior of 0.5), and a threshold of 0.5 is applied to obtain the final speech regions.

In an embodiment, a gender-independent Universal Background Model (UBM) model is trained with 2048 Gaussians followed by a 400-dimensional i-vector extractor. For i-vector extraction, the MFCC features are contextualized with deltas and double deltas prior to utterance-level mean and variance normalization over the speech frames as determined by the SAD system. A PLDA model trained on the SRE 2008 subset of the Mixer data is used to generate the scores for the i-vectors in each test set. I-vectors are length-normalized and reduced to a dimension of 200 using linear discriminant analysis (LDA) before PLDA. These scores are the input to the calibration stage.

Hybrid I-vector/PLDA Speaker Recognition System

In another embodiment, a DNN-based speaker recognition system is used. A hybrid alignment framework for speaker recognition involves using one set of features to determine frame alignments (zero-order statistics) in the Baum-Welch statistics calculation, and using an alternate set of features for the calculation of the first-order statistics. This process provides a more robustly calibrated DNN-based system when bottleneck (BN) features are used to align standard acoustic features during i-vector extraction.

In one specific implementation, we use a DNN BN extractor formed from 20 dimensional power-normalized cepstral coefficients (PNCC) contextualized with principal component analysis discrete cosine transform (pcaDCT) with a window of 15 frames to create 90 dimensional inputs to the DNN that are then mean and variance normalized using a sliding window of three seconds.

The DNN is trained to discriminate 1933 senones using Fisher and Switchboard telephone data, and consists of five layers of 1200 nodes, except the fourth hidden layer, which has 80 nodes and forms bottle neck extraction layer for our system. The first-order features, aligned with the BN features and a 2048-component diagonal covariance UBM, are MFCCs of 20 dimensions also contextualized with pcaDCT using a 15-frame window with an output of 60 dimensions. In all cases, the PCA transform for pcaDCT is learned using a subset of the DNN candidate data. This system extracts 400-dimensional i-vectors which are length-normalized and reduced to a dimension of 200 using LDA before PLDA. The UBM and i-vector extractors for this resulting 620-dimensional feature vector forms the input to a DNN that consists of two hidden layers of sizes 500 and 100. The output layer of the DNN consists of two nodes trained to predict the posteriors for the speech and non-speech classes. These posteriors are converted into likelihood ratios using Bayes rule (assuming a prior of 0.5), and a threshold of 0.5 is applied to obtain the final speech regions.

TBC Systems

In an embodiment, for the UAC similarity metric, three models are used which predict gender, style/channel, and language. These models are trained using the same Mixer data used for all system components in the MFCC speaker recognition system. The input to each of the models are the same i-vectors used for the speaker recognition system and the output classes are given by (1) female vs male for the gender model, (2) interview microphone speech vs. telephone speech over microphone channel vs. telephone speech over telephone channel for the style/channel model, and (3) English vs non-English speech for the language model.

In an embodiment, for the CPLDA similarity metric, we compare two models: one trained using the same data used to train the UAC models and another one trained with the entire PRISM collection, which includes telephone, microphone data from Fisher and Mixer, and simulated noisy and reverberated data. We also added transcoded data using a large variety of codecs including AAC, AMR-NB, CODEC2, MP3, OPUS, and SPEEX, among others, each of them at different sampling rates for a total of 32 different codecs. The data used to train these models was carefully selected not to overlap with any of the data used in the development sets.

In an embodiment, all calibration models are trained using linear logistic regression. TBC calibration models are regularized toward the global calibration parameters. In all cases, an effective prior of 0.01 was used.

Other Applications

While this disclosure focuses on applications to audio-based automated tasks, aspects of the disclosed technologies are equally applicable to other forms of data, such as image data, and other types of comparison-based automated tasks, including but not limited to computer vision-based tasks such as face, object or scene recognition, detection of occlusions in digital images, and anomaly detection.

Example Hardware Implementation

According to one embodiment, the techniques described herein are implemented by at least one computing device. For example, portions of the disclosed technologies may be at least temporarily implemented on a network including a combination of at least one server computer and/or other computing devices. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
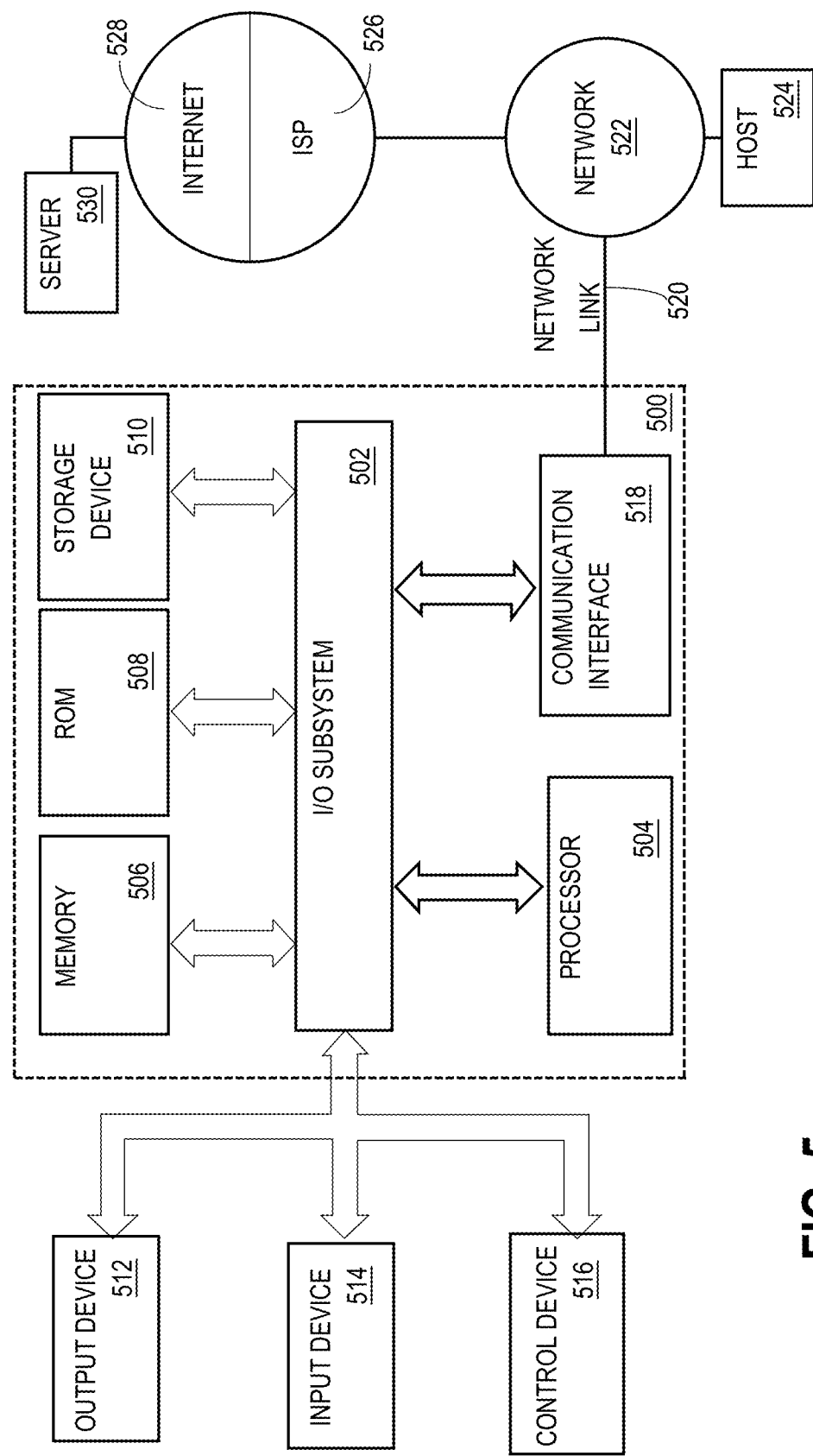
FIG. 5 illustrates an example hardware environment, in an embodiment.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and at least one I/O port. The electronic signal paths are represented schematically in the drawings, for example as lines, unidirectional arrows, or bidirectional arrows.

At least one hardware processor 504 is coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to at least one output device 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

At least one input device 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, at least one ASIC or FPGA, firmware and/or program logic which in combination with the computer system causes or programs computer system 500 to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Experimental Data

Figure 6:
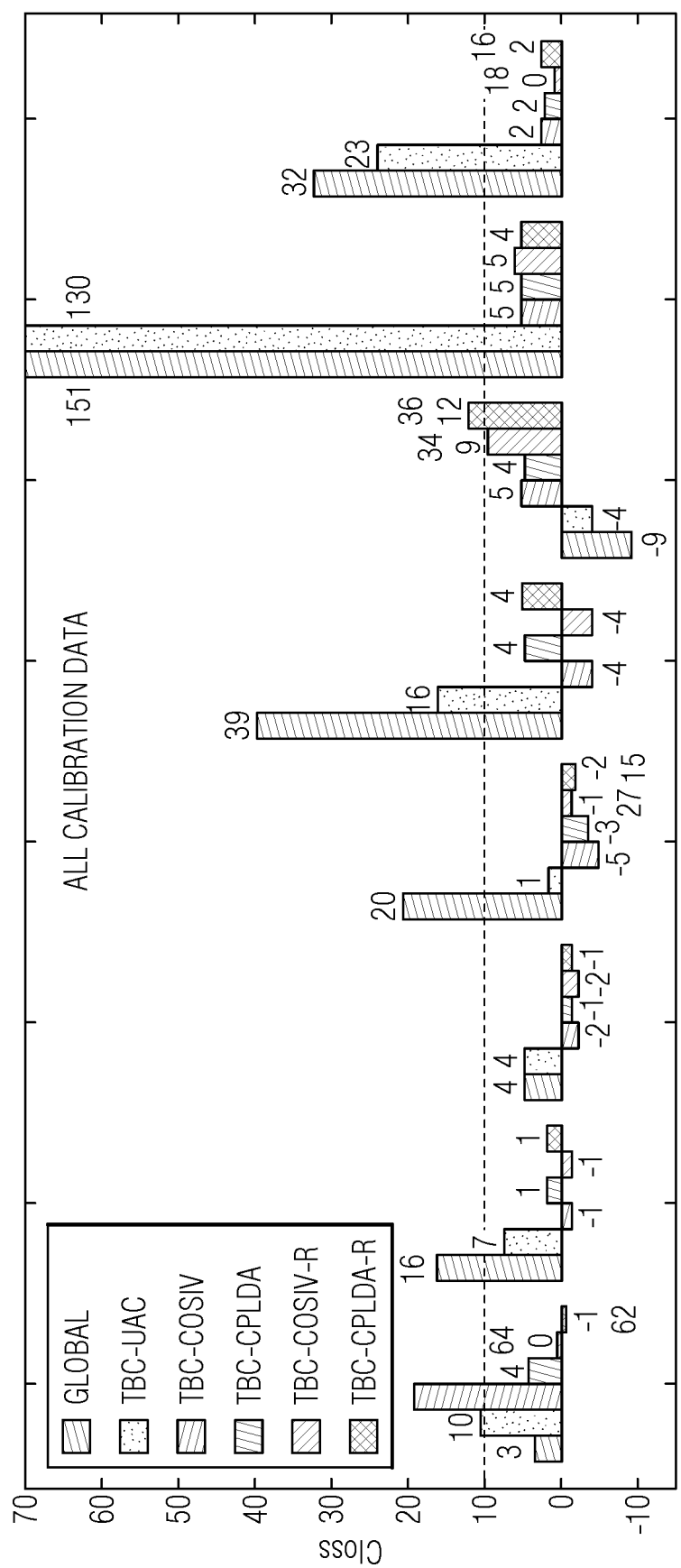
FIG. 6 is a plot of illustrative test results, in an embodiment.

FIG. 6 is a plot of illustrative test results, in an embodiment. The plot in FIG. 6 shows a comparison of results over all the individual test sets for a global calibration model and five selected trial-based calibration (TBC) configurations designed in accordance with this disclosure.

For global calibration and for TBC, the full calibration set is used for all test sets. FIG. 6 shows that (with the exception of SWPH2, for which the global calibration model is better than the matched model) performance on all test sets greatly improves with the disclosed TBC methods. Further, we can see that two of the disclosed similarity metrics (IV and CPLDA) significantly outperform the original UAC metric.

Comparing the IV and the CPLDA metrics, FIG. 6 shows that the IV metric has a significantly worse worst case compared to CPLDA with a Closs for SWCELLP1 of 19% compared to 4% for CPLDA. On average, the TBC method using either of the two disclosed similarity metrics reduces the Closs from 32% using the global calibration model trained on all data to 2% or less, making the calibrated performance almost equal to that of the matched calibration model. In this case, where matched calibration data is available, introducing the rejection option (TBC-IV-R and TBC-CPLDA-R methods) does make a significant difference in the results.

Additional Examples

Illustrative examples of the technologies disclosed herein are provided below. An embodiment of the technologies may include any of the examples or a combination of portions of the examples described below.

In an example 1, a method for improving accuracy of an audio-based identification, recognition, or detection system by adapting calibration to conditions of a trial, the method includes: determining characterization data of a probe audio sample, characterization data of a reference audio sample, and a score, where the score is determined by a trial that compares the probe audio sample to the reference audio sample, where the trial is conducted by a computer that is communicatively coupled to the audio-based identification, recognition, or detection system; generating a calibrated score by mathematically applying one or more parameters to the score; where a value of the one or more parameters is determined using a computer-implemented mathematical model that is trained using candidate data that is selected to match a condition of the trial, where the condition is unknown prior to the trial and the condition is determined based on a combination of the characterization data of the probe audio sample and the characterization data of the reference audio sample; when the candidate data matches the condition of the trial, causing use of the trial by the audio-based identification, recognition, or detection system.

An example 2 includes the subject matter of example 1, where the characterization data of the probe audio sample and the characterization data of the reference audio sample, respectively, are indicative of a behavioral characteristic or an acoustic environmental characteristic or a transmission artifacts characteristic of the probe audio sample and a behavioral characteristic or an acoustic environmental characteristic or a transmission artifacts characteristic of the reference audio sample, respectively. An example 3 includes the subject matter of example 2, where the behavioral characteristic or acoustic environmental characteristic or transmission artifacts characteristic of the probe audio sample and the behavioral characteristic or acoustic environmental characteristic or transmission artifacts characteristic of the reference audio sample, respectively, comprise (i) channel data or (ii) noise data or (iii) reverberation data or (iv) language data or (v) speaker gender data or (vi) sample length data or (vii) at least two of (i), (ii), (iii), (iv), (v), (vi). An example 4 includes the subject matter of any of examples 1-3, and includes, when the candidate data does not match the condition of the trial including at least one of 1) insufficiently matched candidate data or 2) no available candidate data, skipping the step of generating the calibrated score and causing the trial to not be used by the audio-based identification, recognition, or detection system. An example 5 includes the subject matter of any of examples 1-4, and includes training a machine learning-based model using the one or more parameters, and using the machine learning-based model to improve calibration of either the audio-based identification, recognition or detection system or another audio-based identification, recognition, or detection system. An example 6 includes the subject matter of any of examples 1-5, and includes, including augmenting the candidate data with noise data that is computationally-generated based on the condition. An example 7 includes the subject matter of any of examples 1-6, and includes, including generating the parameters by incorporating regularization weight data into a linear logistic regression (LLR)-based algorithmic process performed on the score to generate the calibrated score. An example 8 includes the subject matter of any of examples 1-7, and includes, where the model is a learned model of a type that is selected based on the audio-based identification, recognition, or detection system, where the type is a neural network-based model or a probabilistic linear discriminant analysis (PLDA)-based model or a linear logistic regression-based model. An example 9 includes the subject matter of any of examples 1-8, and includes, where the probe audio sample is compared to the reference audio sample by determining a similarity metric using a condition probabilistic linear discriminant analysis (CPLDA)-based computation or an i vector (IV)-based computation or a universal audio characterization (UAC)-based computation. An example 10 includes the subject matter of any of examples 1-9, and includes, where the parameters include one or more of a scale or a shift or a bias. An example 11 includes the subject matter of any of examples 1-10, and includes, where the audio-based identification, recognition, or detection system executes a speaker recognition task or a speech activity detection system or a language recognition task or a keyword spotting task or a gender recognition task or a channel recognition task or a speaking style recognition task or an active voice-based biometrics task or a passive voice-based biometrics task or a speech transcription task or a speaker segmentation task, and the method comprises determining the parameters based on the audio-based identification, recognition, or detection system.

In an example 12, a system includes: one or more computer processors; a calibration system coupled to the one or more computer processors, where the system performs operations including: determining characterization data of a probe audio sample, characterization data of a reference audio sample, and a score, where the score is determined by a trial that compares the probe audio sample to the reference audio sample, where the trial is conducted by a computer that is communicatively coupled to an audio-based identification, recognition, or detection system; generating a calibrated score by mathematically applying one or more parameters to the score; where a value of the one or more parameters is determined using a computer-implemented mathematical model that is trained using candidate data that is selected to match a condition of the trial, where the condition is unknown prior to the trial and the condition is determined based on a combination of the characterization data of the probe audio sample and the characterization data of the reference audio sample; when the candidate data matches the condition of the trial, causing use of the trial by the audio-based identification, recognition, or detection system.

An example 13 includes the subject matter of example 12, where the characterization data of the probe audio sample and the characterization data of the reference audio sample, respectively, are indicative of a behavioral characteristic or an acoustic environmental characteristic or a transmission artifacts characteristic of the probe audio sample and a behavioral characteristic or an acoustic environmental characteristic or a transmission artifacts characteristic of the reference audio sample, respectively. An example 14. includes the subject matter of example 13, where the behavioral characteristic or acoustic environmental characteristic or transmission artifacts characteristic of the probe audio sample and the behavioral characteristic or acoustic environmental characteristic or transmission artifacts characteristic of the reference audio sample, respectively, comprise (i) channel data or (ii) noise data or (iii) reverberation data or (iv) language data or (v) speaker gender data or (vi) sample length data or (vii) at least two of (i), (ii), (iii), (iv), (v), (vi). An example 15 includes the subject matter of any of examples 12-14, and includes, where the calibration system performs operations including, when the candidate data does not match the condition of the trial including at least one of 1) insufficiently matched candidate data or 2) no available candidate data, skipping the step of generating the calibrated score and causing the trial to not be used by the audio-based identification, recognition, or detection system.

An example 16 includes the subject matter of any of examples 12-15, where the calibration system performs operations including training a machine learning-based model using the one or more parameters, and using the machine learning-based model to improve calibration of either the audio-based identification, recognition or detection system or another audio-based identification, recognition, or detection system. An example 17 includes the subject matter of any of examples 12-16, where the calibration system performs operations including augmenting the candidate data with noise data that is computationally-generated based on the condition. An example 18 includes the subject matter of any of examples 12-17, where the calibration system performs operations including generating the parameters by incorporating regularization weight data into a linear logistic regression (LLR)-based algorithmic process performed on the score to generate the calibrated score. An example 19 includes the subject matter of any of examples 12-18, where the model is a learned model of a type that is selected based on the audio-based identification, recognition, or detection system, where the type is a neural network-based model or a probabilistic linear discriminant analysis (PLDA)-based model or a linear logistic regression-based model. An example 20 includes the subject matter of any of examples 12-19, where the probe audio sample is compared to the reference audio sample by determining a similarity metric using a condition probabilistic linear discriminant analysis (CPLDA)-based computation or an i vector (IV)-based computation or a universal audio characterization (UAC)-based computation. An example 21 includes the subject matter of any of examples 12-20, where the parameters include one or more of a scale or a shift or a bias. An example 22 includes the subject matter of any of examples 12-21, where the parameters are determined based on a speaker recognition task or a speech activity detection system or a language recognition task or a keyword spotting task or a gender recognition task or a channel recognition task or a speaking style recognition task or an active voice-based biometrics task or a passive voice-based biometrics task or a speech transcription task or a speaker segmentation task.

In an example 23, a computer program product includes: one or more non-transitory computer-readable storage media including instructions which, when executed by one or more processors, cause: determining characterization data of a probe audio sample, characterization data of a reference audio sample, and a score, where the score is determined by a trial that compares the probe audio sample to the reference audio sample, where the trial is conducted by a computer that is communicatively coupled to an audio-based identification, recognition, or detection system; generating a calibrated score by mathematically applying one or more parameters to the score; where a value of the one or more parameters is determined using a computer-implemented mathematical model that is trained using candidate data that is selected to match a condition of the trial, where the condition is unknown prior to the trial and the condition is determined based on a combination of the characterization data of the probe audio sample and the characterization data of the reference audio sample; when the candidate data matches the condition of the trial, causing use of the trial by the audio-based identification, recognition, or detection system.

An example 24 includes the subject matter of example 23, where the characterization data of the probe audio sample and the characterization data of the reference audio sample, respectively, are indicative of a behavioral characteristic or an acoustic environmental characteristic or a transmission artifacts characteristic of the probe audio sample and a behavioral characteristic or an acoustic environmental characteristic or a transmission artifacts characteristic of the reference audio sample, respectively. An example 25 includes the subject matter of example 24, where the behavioral characteristic or acoustic environmental characteristic or transmission artifacts characteristic of the probe audio sample and the behavioral characteristic or acoustic environmental characteristic or transmission artifacts characteristic of the reference audio sample, respectively, comprise (i) channel data or (ii) noise data or (iii) reverberation data or (iv) language data or (v) speaker gender data or (vi) sample length data or (vii) at least two of (i), (ii), (iii), (iv), (v), (vi).

An example 26 includes the subject matter of any of examples 23-25, where the instructions, when executed by the one or more processors, cause, when the candidate data does not match the condition of the trial including at least one of 1) insufficiently matched candidate data or 2) no available candidate data, skipping the step of generating the calibrated score and causing the trial to not be used by the audio-based identification, recognition, or detection system. An example 27 includes the subject matter of any of examples 23-26, where the instructions, when executed by the one or more processors, cause training a machine learning-based model using the one or more parameters, and using the machine learning-based model to improve calibration of either the audio-based identification, recognition or detection system or another audio-based identification, recognition, or detection system. An example 28 includes the subject matter of any of examples 23-27, where the instructions, when executed by the one or more processors, cause augmenting the candidate data with noise data that is computationally-generated based on the condition. An example 29 includes the subject matter of any of examples 23-28, where the instructions, when executed by the one or more processors, cause generating the parameters by incorporating regularization weight data into a linear logistic regression (LLR)-based algorithmic process performed on the score to generate the calibrated score. An example 30 includes the subject matter of any of examples 23-29, where the model is a learned model of a type that is selected based on the audio-based identification, recognition, or detection system, where the type is a neural network-based model or a probabilistic linear discriminant analysis (PLDA)-based model or a linear logistic regression-based model. An example 31 includes the subject matter of any of examples 23-30, where the probe audio sample is compared to the reference audio sample by determining a similarity metric using a condition probabilistic linear discriminant analysis (CPLDA)-based computation or an i vector (IV)-based computation or a universal audio characterization (UAC)-based computation. An example 32 includes the subject matter of any of examples 23-31, where the parameters include one or more of a scale or a shift or a bias. An example 33 includes the subject matter of any of examples 23-32, where the instructions, when executed by the one or more processors, cause determination of the parameters based on a speaker recognition task or a speech activity detection system or a language recognition task or a keyword spotting task or a gender recognition task or a channel recognition task or a speaking style recognition task or an active voice-based biometrics task or a passive voice-based biometrics task or a speech transcription task or a speaker segmentation task.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for improving accuracy of an audio-based identification, recognition, or detection system by adapting calibration to conditions of a trial, the method comprising:
    determining characterization data of a trial probe audio sample, characterization data of a trial reference audio sample, and a score, wherein the score is determined by a trial that compares the trial probe audio sample to the trial reference audio sample using a computer-implemented mathematical model or using a metric that is different from the computer-implemented mathematical model, and wherein the trial is conducted by a computer that is communicatively coupled to the audio-based identification, recognition, or detection system;
    determining a condition of the trial based on a combination of the characterization data of the trial probe audio sample and the characterization data of the trial reference audio sample, wherein the condition of the trial is unknown prior to the trial;
    selecting a first set of candidate data from available development data, wherein the first set of candidate data includes a first set of sample pairs, wherein each sample pair of the first set of sample pairs includes a candidate probe audio sample from the available development data and a candidate reference audio sample from the available development data that match the condition of the trial corresponding to the trial probe audio sample and the trial reference audio sample;
    generating, based on the condition of the trial, a second set of candidate data that is separate from the available development data and in addition to the first set of candidate data selected from the available development data, wherein the second set of candidate data comprises a second set of sample pairs, wherein each sample pair of the second set of sample pairs includes a candidate probe audio sample and a candidate reference audio sample;
    training the computer-implemented mathematical model using the first set of candidate data and the second set of candidate data;
    determining a value of one or more parameters using the computer-implemented mathematical model;
    adjusting the score to produce a calibrated score by mathematically applying the value of the one or more parameters to the score; and
    outputting the calibrated score to the audio-based identification, recognition, or detection system.

2. The method of claim 1, wherein the characterization data of the trial probe audio sample and the characterization data of the trial reference audio sample, respectively, are indicative of a behavioral characteristic or an acoustic environmental characteristic or a transmission artifacts characteristic of the trial probe audio sample and a behavioral characteristic or an acoustic environmental characteristic or a transmission artifacts characteristic of the trial reference audio sample, respectively.

3. The method of claim 2, wherein the behavioral characteristic or acoustic environmental characteristic or transmission artifacts characteristic of the trial probe audio sample and the behavioral characteristic or acoustic environmental characteristic or transmission artifacts characteristic of the trial reference audio sample, respectively, comprise (i) channel data or (ii) noise data or (iii) reverberation data or (iv) language data or (v) speaker gender data or (vi) sample length data or (vii) at least two of (i), (ii), (iii), (iv), (v), (vi).

4. The method of claim 1, further comprising, when the first set of candidate data and the second set of candidate data does not match the conditions of the trial including at least one of 1) insufficiently matched candidate data or 2) no available candidate data:
    skipping the step of producing the calibrated score; and
    causing the trial to not be used by the audio-based identification, recognition, or detection system.

5. The method of claim 1, further comprising:
    training a machine learning-based model using the one or more parameters; and
    using the machine learning-based model to improve calibration of either the audio-based identification, recognition or detection system or another audio-based identification, recognition, or detection system.

6. The method of claim 1, further comprising augmenting the first set of candidate data and the second set of candidate data with noise data that is computationally-generated based on the condition.

7. The method of claim 1, further comprising generating the one or more parameters by incorporating regularization weight data into a linear logistic regression (LLR)-based algorithmic process performed on the score to generate the calibrated score.

8. The method of claim 1, wherein the computer-implemented mathematical model is a learned model of a type that is selected based on the audio-based identification, recognition, or detection system, wherein the type is a neural network-based model or a probabilistic linear discriminant analysis (PLDA)-based model or a linear logistic regression-based model.

9. The method of claim 1, wherein the trial probe audio sample is compared to the trial reference audio sample by determining a similarity metric using a condition probabilistic linear discriminant analysis (CPLDA)-based computation or ani vector (IV)-based computation or a universal audio characterization (UAC)-based computation.

10. The method of claim 1, wherein the one or more parameters include one or more of a scale or a shift or a bias.

11. The method of claim 1, wherein the audio-based identification, recognition, or detection system executes a speaker recognition task or a speech activity detection system or a language recognition task or a keyword spotting task or a gender recognition task or a channel recognition task or a speaking style recognition task or an active voice-based biometrics task or a passive voice-based biometrics task or a speech transcription task or a speaker segmentation task, and wherein the method further comprises determining the one or more parameters based on the audio-based identification, recognition, or detection system.

12. A system comprising:
one or more processors;
a calibration system coupled to the one or more processors, wherein the system performs operations comprising:
determining characterization data of a trial probe audio sample, characterization data of a trial reference audio sample, and a score, wherein the score is determined by a trial that compares the trial probe audio sample to the trial reference audio sample using a computer-implemented mathematical model or using a metric that is different from the computer-implemented mathematical model, and wherein the trial is conducted by a computer that is communicatively coupled to the an audio-based identification, recognition, or detection system;
determining a condition of the trial based on a combination of the characterization data of the trial probe audio sample and the characterization data of the trial reference audio sample, wherein the condition of the trial is unknown prior to the trial;
selecting a first set of candidate data from available development data, wherein the first set of candidate data includes a first set of sample pairs, wherein each sample pair of the first set of sample pairs includes a candidate probe audio sample from the available development data and a candidate reference audio sample from the available development data that match the conditions of the trial corresponding to the trial combination of the trial probe audio sample and the trial reference audio sample;
generate, based on the condition of the trial, a second set of candidate data that is separate from the available development data and in addition to the first set of candidate data selected from the available development data, wherein the second set of candidate data comprises a second set of sample pairs, wherein each sample pair of the second set of sample pairs includes a candidate probe audio sample and a candidate reference audio sample;
training a computer-implemented mathematical model using the first set of candidate data and the second set of candidate data;
determining a value of one or more parameters using the computer-implemented mathematical model;
adjusting the score to produce a calibrated score by mathematically applying the value of the one or more parameters to the score; and
outputting the calibrated score to the audio-based identification, recognition, or detection system.

13. The system of claim 12, wherein the characterization data of the trial probe audio sample and the characterization data of the trial reference audio sample, respectively, are indicative of a behavioral characteristic or an acoustic environmental characteristic or a transmission artifacts characteristic of the trial probe audio sample and a behavioral characteristic or an acoustic environmental characteristic or a transmission artifacts characteristic of the trial reference audio sample, respectively, and wherein the behavioral characteristic or acoustic environmental characteristic or transmission artifacts characteristic of the trial probe audio sample and the behavioral characteristic or acoustic environmental characteristic or transmission artifacts characteristic of the trial reference audio sample, respectively, comprise (i) channel data or (ii) noise data or (iii) reverberation data or (iv) language data or (v) speaker gender data or (vi) sample length data or (vii) at least two of (i), (ii), (iii), (iv), (v), (vi).

14. The system of claim 12, wherein the calibration system further performs operations comprising, when the first set of candidate data and the second set of candidate data does not match the conditions of the trial including at least one of 1) insufficiently matched candidate data or 2) no available candidate data:
skipping the step of producing the calibrated score; and
causing the trial to not be used by the audio-based identification, recognition, or detection system.

15. The system of claim 12, wherein the calibration system further performs operations comprising:
training a machine learning-based model using the one or more parameters; and
using the machine learning-based model to improve calibration of either the audio-based identification, recognition or detection system or another audio-based identification, recognition, or detection system.

16. The system of claim 12, wherein the calibration system further performs operations comprising augmenting the first set of candidate data and the second set of candidate data with noise data that is computationally-generated based on the condition.

17. The system of claim 12, wherein the calibration system further performs operations comprising generating the one or more parameters by incorporating regularization weight data into a linear logistic regression (LLR)-based algorithmic process performed on the score to generate the calibrated score.

18. The system of claim 12, wherein the computer-implemented mathematical model is a learned model of a type that is selected based on the audio-based identification, recognition, or detection system, wherein the type is a neural network-based model or a probabilistic linear discriminant analysis (PLDA)-based model or a linear logistic regression-based model, and wherein the trial probe audio sample is compared to the trial reference audio sample by determining a similarity metric using a condition probabilistic linear discriminant analysis (CPLDA)-based computation or ani vector (IV)-based computation or a universal audio characterization (UAC)-based computation, and wherein the one or more parameters are determined based on a speaker recognition task or a speech activity detection system or a language recognition task or a keyword spotting task or a gender recognition task or a channel recognition task or a speaking style recognition task or an active voice-based biometrics task or a passive voice-based biometrics task or a speech transcription task or a speaker segmentation task.

19. A non-transitory computer-readable medium storing instructions for causing one or more processors to perform a method comprising:

- determining characterization data of a trial probe audio sample, characterization data of a trial reference audio sample, and a score, wherein the score is determined by a trial that compares the trial probe audio sample to the trial reference audio sample using a computer-implemented mathematical model or using a metric that is different from the computer-implemented mathematical model, wherein the trial is conducted by a computer that is communicatively coupled to the an audio-based identification, recognition, or detection system;
- determining a condition of the trial based on a combination of the characterization data of the trial probe audio sample and the characterization data of the trial reference audio sample, wherein the condition of the trial is unknown prior to the trial;
- selecting a first set of candidate data from available development data, wherein the first set of candidate data includes a first set of sample pairs, wherein each sample pair of the first set of sample pairs includes a candidate probe audio sample from the available development data and a candidate reference audio sample from the available development data that match the conditions of the trial corresponding to the trial combination of the probe audio sample and the trial reference audio sample;
- generating, based on the condition of the trial, a second set of candidate data that is separate from the available development data and in addition to the first set of candidate data selected from the available development data, wherein the second set of candidate data comprises a second set of sample pairs, wherein each sample pair of the second set of sample pairs includes a candidate probe audio sample and a candidate reference audio sample;
- training a computer-implemented mathematical model using the first set of candidate data and the second set of candidate data;
- determining a value of one or more parameters using the computer-implemented mathematical model;
- adjusting the score to produce a calibrated score by mathematically applying the value of the one or more parameters to the score; and
- outputting the calibrated score to the audio-based identification, recognition, or detection system.

20. The computer program product of claim 19, wherein the characterization data of the trial probe audio sample and the characterization data of the trial reference audio sample, respectively, are indicative of a behavioral characteristic or an acoustic environmental characteristic or a transmission artifacts characteristic of the trial probe audio sample and a behavioral characteristic or an acoustic environmental characteristic or a transmission artifacts characteristic of the trial reference audio sample, respectively, and wherein the behavioral characteristic or acoustic environmental characteristic or transmission artifacts characteristic of the trial probe audio sample and the behavioral characteristic or acoustic environmental characteristic or transmission artifacts characteristic of the trial reference audio sample, respectively, comprise (i) channel data or (ii) noise data or (iii) reverberation data or (iv) language data or (v) speaker gender data or (vi) sample length data or (vii) at least two of (i), (ii), (iii), (iv), (v), (vi), and wherein the instructions, when executed by the one or more processors, further cause generating the one or more parameters by incorporating regularization weight data into a linear logistic regression (LLR)-based algorithmic process performed on the score to generate the calibrated score, and wherein the computer-implemented mathematical model is a learned model of a type that is selected based on the audio-based identification, recognition, or detection system, wherein the type is a neural network-based model or a probabilistic linear discriminant analysis (PLDA)-based model or a linear logistic regression-based model, and wherein the trial probe audio sample is compared to the trial reference audio sample by determining a similarity metric using a condition probabilistic linear discriminant analysis (CPLDA)-based computation or an i vector (IV)-based computation or a universal audio characterization (UAC)-based computation, and wherein the instructions, when executed by the one or more processors, cause determination of the one or more parameters based on a speaker recognition task or a speech activity detection system or a language recognition task or a keyword spotting task or a gender recognition task or a channel recognition task or a speaking style recognition task or an active voice-based biometrics task or a passive voice-based biometrics task or a speech transcription task or a speaker segmentation task.

* * * * *